United States Patent
Abaci et al.

(10) Patent No.: US 11,410,063 B2
(45) Date of Patent: Aug. 9, 2022

(54) SELF-INTELLIGENT IMPROVEMENT IN PREDICTIVE DATA MODELS

(71) Applicant: B.yond, Inc., Frisco, TX (US)

(72) Inventors: Baris Abaci, Istanbul (TR); Johnny Ghibril, Boston, MA (US)

(73) Assignee: B.YOND, INC., Frisco, TX (US)

(*) Notice: Subject to any disclaimer, the term of this patent is extended or adjusted under 35 U.S.C. 154(b) by 864 days.

(21) Appl. No.: 16/261,176

(22) Filed: Jan. 29, 2019

(65) Prior Publication Data

US 2020/0104737 A1   Apr. 2, 2020

Related U.S. Application Data

(60) Provisional application No. 62/738,867, filed on Sep. 28, 2018.

(51) Int. Cl.
*G06F 7/60* (2006.01)
*G06N 7/00* (2006.01)
*G06N 20/00* (2019.01)
*G06F 17/15* (2006.01)

(52) U.S. Cl.
CPC .......... *G06N 7/005* (2013.01); *G06F 17/15* (2013.01); *G06N 20/00* (2019.01)

(58) Field of Classification Search
CPC .................................................. G06N 7/005
USPC ............................................................ 703/2
See application file for complete search history.

(56) References Cited

U.S. PATENT DOCUMENTS

| | | | |
|---|---|---|---|
| 2008/0167839 A1* | 7/2008 | Miller | G05B 23/021 703/2 |
| 2009/0106178 A1* | 4/2009 | Chu | G06N 20/00 706/14 |
| 2016/0155080 A1* | 6/2016 | Gnanasambandam | G06Q 10/063112 379/265.03 |
| 2018/0011459 A1* | 1/2018 | Boettcher | G05B 19/042 |
| 2018/0089591 A1* | 3/2018 | Zeiler | G06F 3/048 |

OTHER PUBLICATIONS

PCT International Search Report and Written Opinion, PCT Application No. PCT/US2019/053437, dated Jan. 15, 2020, 11 pages.

* cited by examiner

*Primary Examiner* — Timothy A Mudrick
(74) *Attorney, Agent, or Firm* — Fenwick & West LLP

(57) ABSTRACT

A model assessor retrieves a plurality of predicted outputs from a plurality of models, each predicted output generated using one of the models based on one or more data inputs and a regression model. The model assessor generates a candidate model, which includes as input 1) the one or more data inputs of a selected model of the plurality of models and 2) a predictive output of one or more other models of the plurality of models or one or more other data inputs. A correlation is computed between an actual output and a predicted output of the candidate model, and the model assessor determines if the correlation score exceeds a threshold criteria. If so, the selected model is replaced with the candidate model. Otherwise, the candidate model is deleted.

20 Claims, 6 Drawing Sheets

305 Predicted Outputs

| MessageData | TimeStamp | Input | Actual | TimeStamp |
|---|---|---|---|---|
| 1.3 | 2018-10-02 16:52:30 | NULL | NULL | NULL |
| 2.4 | 2018-10-02 17:52:30 | NULL | NULL | NULL |
| 1.8 | 2018-10-02 17:55:30 | NULL | NULL | NULL |

310 Retrieving Data Inputs, Actual Outputs, and Timestamps

| MessageData | TimeStamp | Input | Actual | TimeStamp |
|---|---|---|---|---|
| 1.3 | 2018-10-02 16:52:30 | 1.2,2.3,4.5 | 5.4 | 2018-10-02 16:52:30 |
| 2.4 | 2018-10-02 17:52:30 | 3.6,5.2,2.5 | 4.2 | 2018-10-02 17:52:25 |
| 1.8 | 2018-10-02 17:55:30 | 2.2,4.3,3.5 | 3.4 | 2018-10-02 17:52:32 |
|  |  | 5.2,2.3,3.5 | 4.6 | 2018-10-02 17:55:25 |

315 Finding matching Timestamps for Data Inputs and Actual Outputs

| MessageData | TimeStamp | Input | Actual | TimeStamp |
|---|---|---|---|---|
| 1.3 | 2018-10-02 16:52:30 | 1.2,2.3,4.5 | 5.4 | 2018-10-02 16:52:30 |
| 2.4 | 2018-10-02 17:52:30 | 2.3,4.3,3.5 | 3.4 | 2018-10-02 17:52:32 |
| 1.8 | 2018-10-02 17:55:30 |  |  |  |

320 Finding additional matching Timestamps within a range of Predicted Output Timestamps

| MessageData | TimeStamp | Input | Actual | TimeStamp |
|---|---|---|---|---|
| 1.3 | 2018-10-02 16:52:30 | 1.2,2.3,4.5 | 5.4 | 2018-10-02 16:52:30 |
| 2.4 | 2018-10-02 17:52:30 | 2.2,4.3,3.5 | 3.4 | 2018-10-02 17:52:32 |
| 1.8 | 2018-10-02 17:55:30 | 5.2,2.3,3.5 | 4.6 | 2018-10-02 17:55:25 |

FIG. 3

SELF-INTELLIGENT IMPROVEMENT IN PREDICTIVE DATA MODELS

CROSS-REFERENCE TO RELATED APPLICATION

This application claims priority to U.S. Provisional App. No. 62/738,867, filed Sep. 28, 2018, which is hereby incorporated by reference in its entirety.

FIELD OF ART

The disclosure generally relates to the field of machine learning, and specifically to self-intelligent improvement in predictive data models.

BACKGROUND

Computer models have been designed to predict a variety of data outputs, based on various inputs. For example, models may be used to predict of cellular network congestion levels, meteorological conditions, traffic patterns, and so on. However, a disadvantage to many of these computer models is that they have to be generated and updated by hand, i.e., a human needs to intervene in order to create and/or update the model. This creates a significant bottleneck in the maintenance of these computer models. While ideally a computer would be utilized to perform these hand-driven tasks, the ability for a computer to do so is not a trivial one. A computer cannot simply implement any method that is originally performed by a human in creating the model, as a human may apply domain knowledge and other experience to creating the model that is unavailable to the computer. Instead, a completely different technique is needed for the computer which has not been practiced before and which provides an improvement to the functioning of the computer. Therefore, what is lacking is a method for a computer to self-intelligently generate and update predictive models for data.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 3 is an example of a matching between a set of actual output data and the predictive output data for correlation testing, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only.

Embodiments herein disclose a model assessor that receives a plurality of predicted outputs from a plurality of models. Each of these predicted outputs is generated using one of the models based on one or more data inputs and a regression model. Each model can be initially generated using one or more regression techniques applied to the data inputs. The model assessor generates a candidate model, which includes as input 1) the one or more data inputs of a selected model of the plurality of models, and 2) a predictive output of one or more other models of the plurality of models or one or more other data inputs. Thus, the candidate model includes additional inputs beyond that of the existing selected model. A correlation test is computed between an actual output and a predicted output of the candidate model. Using the results of this test, the model assessor determines if the correlation score exceeds a threshold criteria, which may be, for example, a threshold value based on the average threshold score of multiple candidate models. If the threshold criteria is exceed, the selected model is replaced with the candidate model. Otherwise, the candidate model is deleted.

Example System for Self-Intelligent Improvement in Predictive Models

Figure 1:
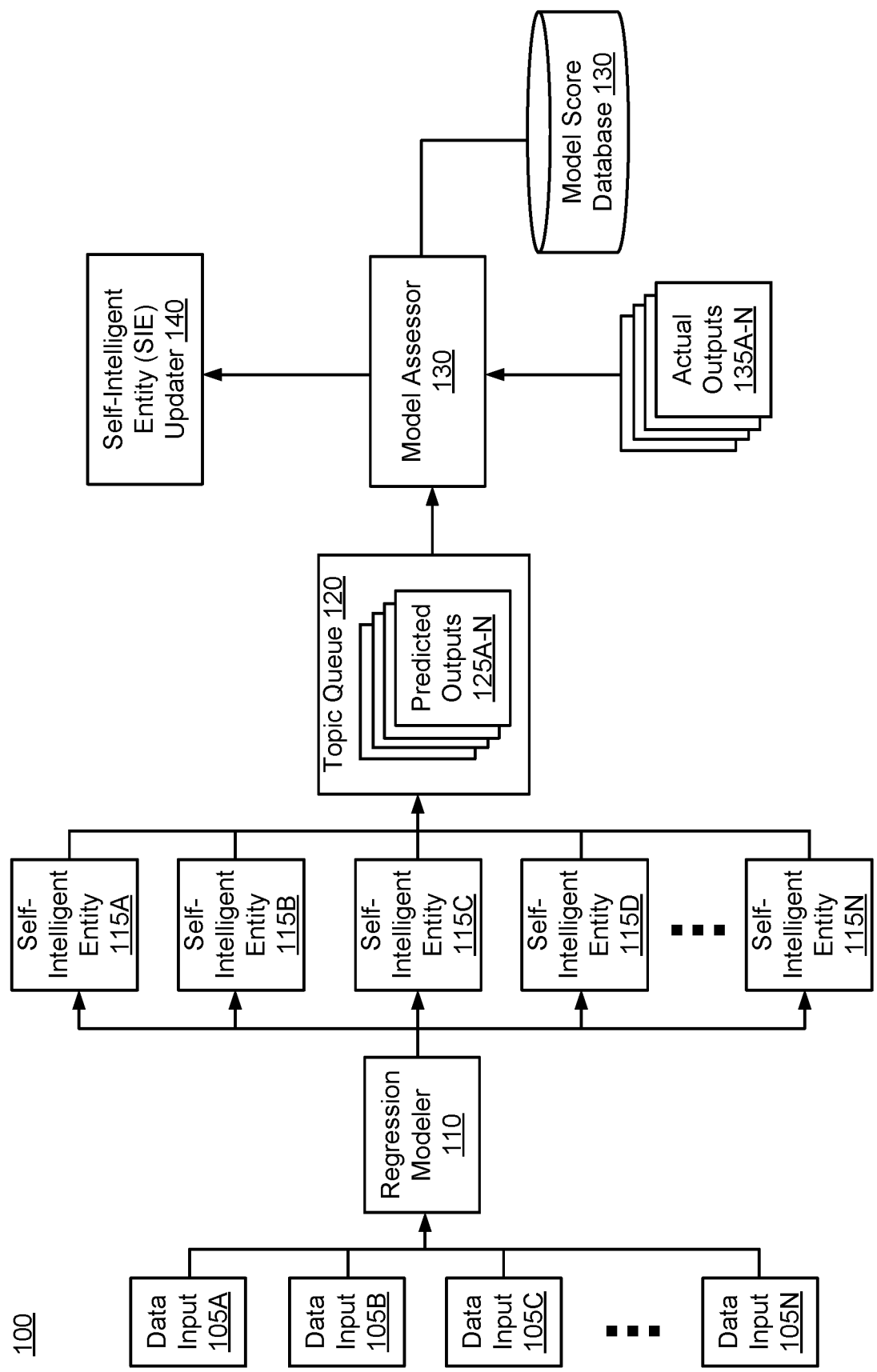
FIG. 1 illustrates a system for self-intelligent improvement to predictive data models, according to an example embodiment.

FIG. 1 illustrates a system 100 for self-intelligent improvement to predictive data models, according to an example embodiment. The system 100 may include one or more data inputs 105A-N (generally 105), a regression modeler 110, one or more self-intelligent entities 115A-N (generally 115), a topic queue 120 to receive one or more predictive outputs 125A-N (generally 125) from the self-intelligent entities 115, a model assessor 130, a model score database 130, one or more actual outputs 135A-N, and a self-intelligent entity updater 140. Although a certain configuration of elements is illustrated here, in other embodiments the number and configuration of elements differ.

The data inputs 105 include any data elements that may be gathered from various data sources. The sources may include relational data sources, file system sources, real time data, and so on. The data may be pre-processed, or based on raw data. The data may be sampled in real time, or may be batched data. The data may be provided in numerical format, or may be categorical data, which may be represented numerically using dummy variables. The data may also include other binary data, such as image pixel values, text strings, audio sampling information, and so on. The data inputs 105 may describe a variety of information, such as cellular tower usage (e.g., current connected users to a tower, downstream bandwidth used, upstream bandwidth used), network data (e.g., network latency, network bandwidth usage), object image data, air quality data, meteorological data, traffic data (e.g., number of vehicles on a road), medical/health data (e.g., blood pressure, heartbeat, blood test results), socioeconomic information (e.g., race, gender, income, education level). Other information aside from those described here may also be used as data inputs 105.

The regression modeler 110 receives the data inputs 105 and generates one or more of the self-intelligent entities 115 using one or more regression analysis techniques on the data inputs 105. Using selection information stored in one or more configuration data, or by random or heuristic selection, the regression modeler 110 selects one or more data inputs 105 to be independent variables, and one data input 105 to be a dependent variable. These selected data inputs 105 may be selected from the same data source or group of related data sources. Data sources are related if the information they describe have some relationship to each other (e.g., the information describes different aspects of the same element or group of elements).

The regression modeler 110 may select a subset of the selected data inputs 105, and use various regression techniques to attempt to model the dependent variable data input 105 using the independent variable(s) data input(s) 105. The regression modeler 110 determines if the resulting model of the dependent variable using the independent variable(s) is significant (e.g., the p value>0.05). The regression modeler 110 may also test for errors to determine that they are unbiased, and test for other issues that might invalidate the model. If the model does not pass the significance test or is otherwise invalid, it is discarded. Otherwise, the regression modeler 110 tests the model against a validation set. The validation set may include another subset of the selected data inputs 105. The regression modeler 110 may determine if the model can accurately predict the values in the validation set, for example, by using a cross-validation method (e.g., holdout, k-fold, Monte Carlo cross-validation). If the predictive value (e.g., as measured by some mean squared error, mean deviation, or other measurement) exceeds some threshold value (e.g., within 10% of the validation set), then the regression modeler 110 may determine that the model is valid, and publishes the model as a self-intelligent entity 115.

The regression techniques that may be used include, but are not limited to: 1) linear regression, 2) logistic regression, 3) polynomial regression, 4) stepwise regression, 5) ridge regression, 6) lasso regression, and 7) elastic net regularization.

The self-intelligent entities (SIEs) 115 are the set of published models that have been validated by the regression modeler 110. Thus, each SIE 115 includes a model (e.g., a regression model) that attempts to predict a predicted output 125 using one or more data inputs 105. Each SIE 115 may be published on a worker node of a container system (e.g., Docker or Kubernetes). A container system is a system that implements operating-system-level virtualization. Each node in the container system may share resources with other nodes in the container system, but these resources may be isolated using operating system level features (e.g., a Linux jail). This is in contrast to a virtual machine, which instantiates an entirely new operating system instance in a virtualized hardware environment to execute each node or unit of the system.

Each SIE 115 node may be further configured using various configuration files which indicate hardware resource allocations (e.g., CPU, memory, etc.), external connections to data sources, and where to publish outputs, such as to which topic or topics in the topic queue 120 to publish a predicted output.

The container system may further include the various libraries and other tools that are needed to allow for the SIE 115 to execute. For example, the libraries and tools may include various math libraries for the SIE 115 executable code to generate output, input/output libraries to allow the SIE 115 to receive requests and output responses, and so on.

Each SIE 115 may be scheduled to execute to access the data inputs 115 and generate a predicted output 125 on a routine schedule, or may instead generate a predicted output 125 upon request. If requested on-demand, the requests may be provided using a Representational State Transfer (REST) API wrapper. The data may also be available via a batch API served by an operating system level shell script that is exposed to the container system. The request may be made by a third-party application (e.g., a CRM or customer-relationship management application, finance application, or other application) or by a scheduled task (e.g., maintenance or system operations).

If requested on-demand, the results generated by the SIE 115 may be delivered to the invoker application. The SIE 115 may also publish the results to the topic queue 120 as previously noted, or to any other service such as a stream-processing software platform (e.g., Kafka) or message broker software (e.g., RabbitMQ).

In one embodiment, the results from the SIE 115 are delivered in a standard message format, such as a JSON (JavaScript Object Notation) object, which may be in the following format:

{"UID":GUID,"SOURCE":STRING,"VERSION": STRING,"TIME":TIMESTAMP, "PREDICTION":NUMERIC}

In this format, UID indicates an identifier for the result, SOURCE indicates the SIE 115 which generated the result, VERSION indicates the version of the SIE, TIME indicates the time of the result was generated, and PREDICTION indicates the value of the predicted output 125.

The topic queue 120 receives predicted outputs 125 from the SIEs 115. Each of the predicted outputs 125 may be assigned to different topics within the topic queue 120. Each topic describes a category of predicted outputs 125 that have some relationship with each other. The topic may be selected by data source from which the predicted outputs 125 in that topic were generated, based on the data type of the input data used to generate the predicted output 125, based on the category of data for which the predicted output 125 is predicting, and so on. In one embodiment, the topics may be selected based on a configuration file.

The predicted outputs 125, which as described may be stored in standard message formats, are processed by the topic queue 120 in a first-in-first-out (FIFO) format. This ensures that the timestamps of the predicted outputs 125 are given priority. If a predicted output 125 is received late by the topic queue 120 (e.g., in excess of 10,000 milliseconds from the timestamp indicated in the predicted output 125), then the predicted output 125 may be dropped from the queue due to it being stale data.

The predicted outputs 125 from the topic queue 120 that are "subscribed" to by each SIE 115 are used by the model assessor 130, as further described below, in order to improve upon the predictive accuracy of the existing SIEs 115.

The model assessor 130 automatically combines predicted outputs 125 from other SIEs 115 with existing inputs of an existing SIE to generate new candidate models and to assess the predictive accuracy of the new models. If the new models have predicted outputs that have a higher correlation to the actual outputs 135 than the predicted outputs of the existing SIE, the existing SIE is updated with the new model using the SIE updater 140.

As noted, each SIE 115 is subscribed to one or more topics in the topic queue 120. An SIE 115 may be subscribed to topics that match the topic to which the SIE 115 publishes its own predicted output 125, to a category of topics related to the topic to which the SIE 115 publishes its output, and/or in accordance with topics indicated in a configuration file. The model assessor 130 may retrieve the predicted outputs 125 of the topics for which an SIE 115 is subscribed to, and may in some cases store these predicted outputs 125 in a cache. The model assessor 130 further identifies the actual output 135 that matches the predicted output 125 for an SIE 115. The actual output 135 represents real data, rather than predicted data. As noted, each SIE 115 may predict one of the data inputs 105 as a dependent variable. Therefore, the actual output 135 may in one case be the data input 105 that corresponds to the dependent variable for which the SIE 115 is predicting.

Figure 4:
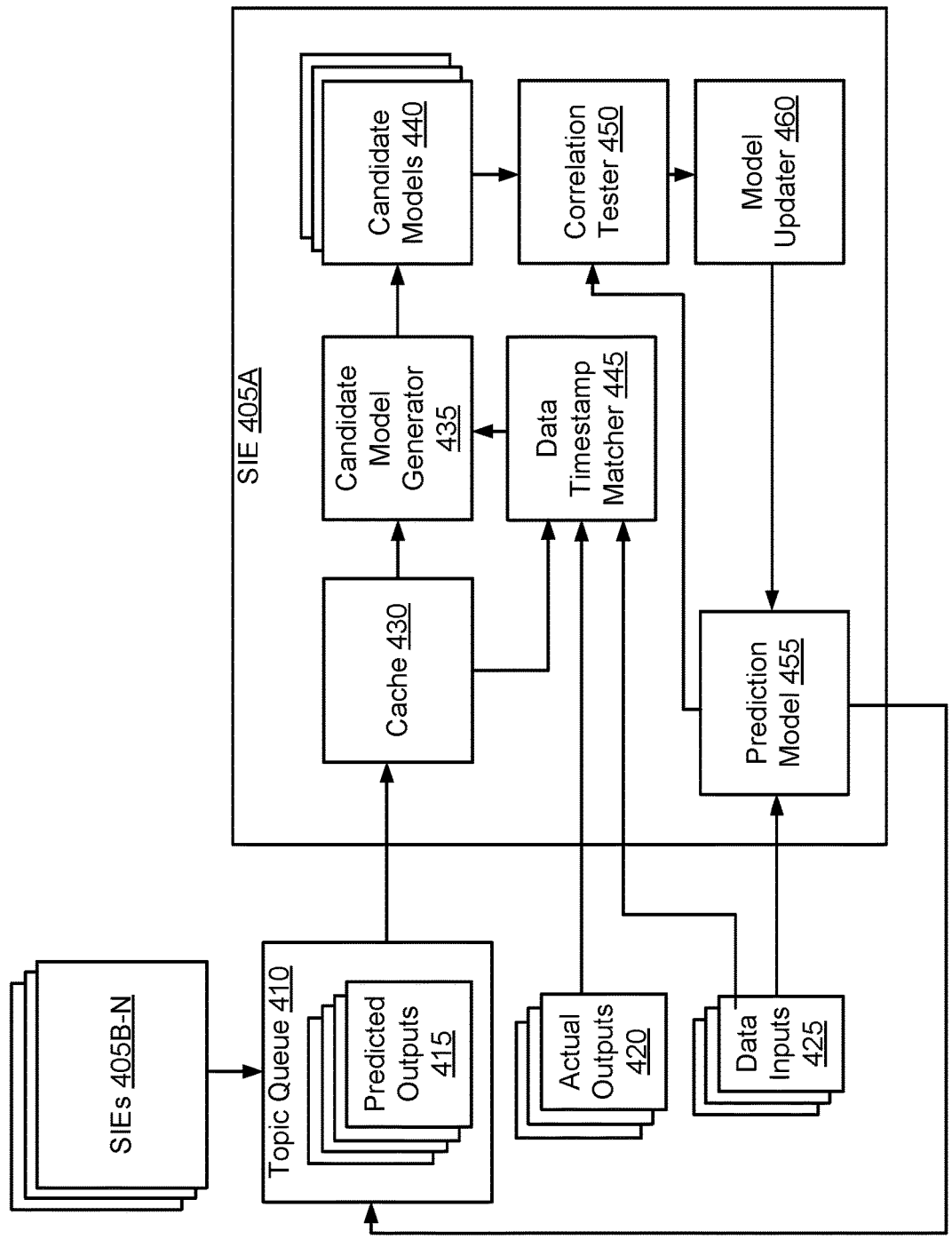
FIG. 4 is an alternative embodiment for the self-intelligent entity of FIG. 1, according to one embodiment.

The model assessor 130 uses one or more of the predicted outputs 125 in the topics for which the SIE 115 is subscribed, may combine these with additional data inputs 105, and uses regression techniques to generate a new candidate model based on these input values. The new candidate model that is generated can also predict the same predicted output 125 as the existing SIE 115. The model assessor 130 determines if the new candidate model has a higher prediction accuracy than the existing SIE 115 by performing correlation tests with the actual output 135 corresponding to the predicted output 125. These correlation scores may be stored in the model score database 130. If the correlation tests indicate a correlation score above a threshold value or criteria, the model assessor 130 may certify the candidate model as a good model and send it to the SIE updater 140 to update the existing SIE 115 model with the candidate model. If the candidate model uses a predicted output generated by another SIE 115, that other SIE 115 may be integrated into the updated SIE 115 model. Although the functions of the model assessor 130 are described in a separate component from the SIE 115, in one embodiment, the functions of the model assessor 130 are integrated into each SIE, e.g., into the node for each SIE. Thus, each SIE may independently improve upon itself. This embodiment is illustrated in FIG. 4. Additional details of the model assessor 130 will be described below with regards to FIG. 2.

In one embodiment, the correlation scores for candidate models in the model score database 130 may be averaged. This average score, if greater than the threshold value, may be used as a new threshold value upon which new candidate model correlation scores are compared against.

By using such as system, models may be self-improved by a computer without human intervention. Previously, to improve the predictive capability of a model, a human may have needed to tweak the inputs used by the model and the type of analysis used in order to generate a better prediction. This can be costly and time consuming and require expert domain knowledge of the field. In contrast, the system here may automatically improve a model without the input of a human. Furthermore, by being able to use the outputs of existing SIEs to improve the results of other SIEs, the system allows for multiple layers of data processing, resulting in more accurate predictions that may be based on multiple sub-layers of predictions, something that cannot be practically achieved by a human.

Model Assessor

Figure 2:
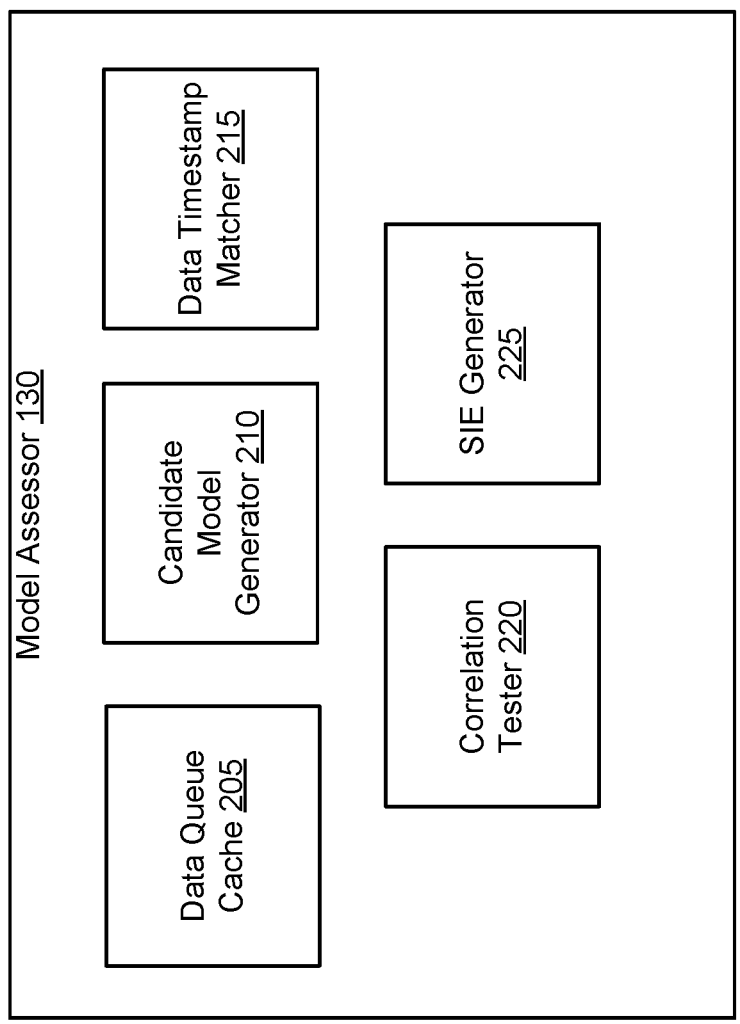
FIG. 2 is a detailed block diagram of the model assessor of FIG. 1, according to an example embodiment.

FIG. 2 is a detailed block diagram of the model assessor 130 of FIG. 1, according to an example embodiment. The model assessor 130, in one embodiment, includes a data queue cache 205, a candidate model generator 210, a data timestamp matcher 215, a correlation tester 220, and a SIE generator 225. In other embodiments, the functionality of the model assessor 130 may be separated into different components than the ones shown here.

The data queue cache 205 caches the predicted outputs 125 received from the topic queue 120 for each SIE 115. The predicted outputs 125 that may be cached includes any data that a SIE 115 is subscribed to in the topic queue 120. If a predicted output 125 had already previously been tested and determined not to improve the predictive accuracy of the SIE 115, that predicted output 125 may be kept in the cache for a predetermined amount of time. However, if a new predicted output 125 that has not been tested (e.g., it may have been generated by a new version of a SIE, been generated by a newly created SIE) is encountered, that predicted output 125 will be forwarded to the candidate model generator 210. In one embodiment, the data is forwarded to the candidate model generator 210 after a threshold number of predicted outputs 125 of that type have been cached, or when a maximum number of samples have been reached. In other embodiments, no data queue cache 205 exists and the predicted outputs 125 are processed directly from the topic queue 120.

The candidate model generator 210 generates new candidate models using the data inputs 105 that an existing SIE 115 is already using to make a prediction, as well as new data inputs 105 and/or predicted outputs 125 for which the existing SIE 115 is subscribed to. In some cases, some of the original data inputs 105 may also be removed. Thus, the candidate model generator 210 may generate multiple candidate models having different combinations of added and removed data. As each SIE 115 may be triggered at different times, the data from the predicted outputs 125 for which the existing SIE 115 is subscribed may not match in timestamps to the data inputs previously used by the existing SIE 115 to make predictions or to the actual outputs 135 that have been recorded. Therefore, an additional process may be performed by the data timestamp matcher 215 to find data with matching timestamps or timestamps that are within a threshold range of each other in order for the candidate model generator 210 to generate the candidate model using examples of data that have matching or similar timestamps to each other. Additional details regarding the data timestamp matcher 215 will be described below. The new candidate model may be generated by the candidate model generator 210 using one or more of the regression techniques described above for the regression modeler 110 above. If the new candidate model incorporates the predicted outputs of another SIE, then the model used for that SIE will also be included in the model. After generation of the new candidate model(s), the candidate model generator 210 sends the new candidate model(s) to the correlation tester 220 to determine if the prediction made by the model correlates closer to the actual results compared to the original SIE 115.

The data timestamp matcher 215 may pre-process the data used by the candidate model generator 210 before generating the new candidate model. Some SIEs 115 may only be triggered occasionally rather than on a consistent schedule. Therefore, the predicted outputs 125 from these SIEs 115 may only be generated occasionally as well. When generating a new candidate model, the candidate model generator 210 may perform a regression analysis, using as the dependent variable the actual output 135 corresponding to the predicted output 125 that the existing SIE 115 is predicting, and using as independent variables the data inputs 105 already used by the SIE, as well as the predicted outputs 125 of other SIEs. For the regression analysis to be successful, each example of independent and dependent values should share the same, or similar timestamp. An example of the values refers to a single instance of the independent variable values and a single corresponding dependent variable value. The data timestamp matcher 215 is used to find these examples of data. To do this, the data timestamp matcher 215 gathers the predicted outputs 125 which are under consideration for the candidate model, and determines the timestamps associated with these predicted outputs. The data timestamp matcher 215 searches through the actual outputs 135 to find actual outputs 135 with timestamps matching those timestamps of the gathered predicted outputs 125. These actual outputs 135 are the actually recorded values of the dependent variable for which the SIE 115 has been predicting. The data timestamp matcher 215 also searches through the data inputs 105 that are used by the SIE 115 to find those that have timestamps that also match the timestamps of the gathered predicted outputs 125. Each example of actual outputs 135, data inputs 105, and predicted outputs 125 with matching timestamps are indicated and/or stored by the data timestamp matcher 215 as data that may be used in the regression analysis by the candidate model generator 210.

However, in some cases, simply finding matching timestamps may not produce sufficient examples of data to generate a good candidate model. Therefore, the data timestamp matcher 215 further searches for actual outputs 135 and data inputs 105 that have timestamps that are closest in range to those timestamps of the gathered predicted outputs 125, i.e., within a window of time of each timestamp of the gathered predicted outputs 125. These additional actual outputs 135 and data inputs 105 may be identified iteratively, with the data timestamp matcher 215 searching within a larger and larger range surrounding a timestamp of a predicted output 125 with each iteration to find matching entries. The data timestamp matcher 215 may iterate until a maximum temporal range is reached, resulting in additional matches of actual outputs 135 and data inputs 105. These additional examples of data are combined with the examples of data having exact timestamp matches and sent to the candidate model generator 210 to generate the candidate model.

The correlation tester 220 determines if any of the candidate models generated by the candidate model generator 210 have a prediction accuracy that is greater than the original SIE upon which the candidate model is based. As noted previously, the candidate model generator 210 generates a new candidate model using data inputs 105 used by the original SIE 115 as well as additional predicted outputs 125 and/or other data inputs 105 as input features, in order to predict the same output as the original SIE 115.

The correlation tester 220 tests the output from the candidate model to see if the candidate model output correlates more closely to the actual output when compared to the output generated by the existing SIE. This correlation may be performed using various methods, such as 1) linear correlation, 2) linear regression, 3) lasso (least absolute shrinkage and selection operator), 4) MIC (maximal information coefficient), 5) RF (random forest), 6) RFE (recursive feature elimination), 7) ridge, 8) stability test, and/or 9) mean comparison.

The correlation tester 220 may use as validation data for the correlation process the same validation set that was used to test the existing SIE (as described above), or use a different validation set of data. If the candidate model includes as an input feature a predicted output 125 of another SIE, the validation set that was used to test that SIE may also be included, as the other SIE needs to be executed in order to generate the predicted output that is used as an input for the candidate model.

After the correlation tester 220 applies one or more of the above correlation test methods to the candidate model using some validation data, the correlation tester 220 generates a score based on the results. The computation of the score may be based on the result/output of the correlation test (e.g., a correlation coefficient), modified by additional rules. These rules may modify the result of the correlation test, indicate how the correlation test is to be executed, and/or instruct the correlation tester 220 to drop the result. One rule may indicate a minimum dataset size for which results are accepted. For example, the rule may require that 2000 examples of data be acquired for the validation set in order to achieve a large minimum data set, with the 2000 examples divided into 10 sets of data. Another rule may specify a minimum correlation value (e.g., |0.7|), below which the score is dropped and the candidate model is not considered. Another rule may specify a threshold arithmetic average of correlations (e.g., average of 10 folds) below which the result is not accepted. Yet another rule may specify a weighted average threshold of the correlations that weights the correlations in proportion to the time gaps between the timestamps of the predicted outputs 125 and the data inputs 105 and/or actual outputs 135 used to generate the candidate model, and if the score is below this threshold, the result is dropped). After computing the correlation value and generating the score, the correlation tester 220 may store the score, as well as information about the candidate model, in a database, such as the model score database 130. The information that may be stored may include information such as a data source used to generate the model, version, target, target_version, score time threshold, average threshold, and status for the candidate model.

In another embodiment, the correlation tester 220 tests the candidate model over multiple sets of validation data. This validation data may be gathered over time. The correlation tester may generate a correlation score for the candidate model for each validation data set, and stores this correlation score in the model score database 130.

The SIE generator 225 generates the new SIE using the candidate model that uses the additional inputs (e.g., the predictive outputs from the other SIEs 115) to replace the existing SIE when the score for the candidate model, as computed by the correlation checker 220, exceeds a threshold and/or a certain criteria, i.e., it predicts the same output with higher accuracy than the existing SIE. As noted above, the correlation score for a candidate model may be stored in a database, and if the correlation score exceeds a fixed threshold value, or exceeds an average correlation score of all candidate models (whichever is greater), the candidate model may be marked as a "strong" model. If the correlation score of the candidate model is in between a fixed threshold value and the average score, the candidate model may be marked as a "high" model. Otherwise, if below the fixed threshold value, the model may be marked as a "low" model. If a model is rated as "high," the SIE generator 225 may generate a new SIE using the candidate model to replace the original SIE, with the new SIE including any SIE with predicted outputs which are used as inputs for the candidate model.

In another embodiment, in the case where the correlation tester 220 generates multiple correlation scores for a candidate score, each correlation score is compared to the average score and fixed threshold score, and given a "strong," "high," and "low" indication. If the number of "strong" and "high" indications among all computations of the correlation score exceed a threshold value, the SIE generator 225 generates an SIE to replace the original SIE.

When the candidate model relies on a predictive output of another SIE 115, the SIE generator 225 includes in the new SIE the other SIE 115. This creates an SIE with more than one layer of input and output, with the output of the other SIE forming an input of the candidate model, and the candidate model generating its own output that is the output of the new SIE.

In one embodiment, the new SIE model is persisted along with the original SIE. This may be useful when requests for predictions only include input features of the original SIE and not the new SIE.

Example of Data Timestamp Matching

FIG. 3 is an example of a matching between a set of actual output data and the predictive output data for correlation testing, according to an embodiment. FIG. 3 illustrates an example of the data matching process which may be performed by the data timestamp matcher 315. At 305, an example of predicted outputs from an SIE are shown. The predicted outputs are listed under the column "Message-Data," with associated timestamps indicated. At 310, data inputs and actual outputs with associated timestamps that are within the total range of timestamps of the predicted outputs are retrieved. The actual outputs are indicated in the "Actual" column, while the data inputs are indicated in the "Input" column. For example, the timestamps of the predicted outputs start at 16:52:30 and ends at 17:55:30. Therefore, actual data and data inputs within this range of timestamps are retrieved.

At 315, the actual outputs and data inputs are filtered so that only the actual outputs and data inputs that have exact matching timestamps to timestamps of the predicted outputs remain. At 320, additional matches of actual outputs and data inputs are added. These are selected by taking each timestamp of a predicted output, and performing multiple iterations to find those actual outputs and data inputs that have timestamps that are near the timestamp of the predicted output. At each iteration, a timestamp of a predicted output is expanded to a window of time surrounding the original timestamp value (e.g., ±1 second to the timestamp). Any timestamps of the actual outputs and data inputs within this window are added back. This is repeated for all timestamps of the predicted outputs for that iteration. Multiple iterations are completed until a maximum window value is reached (e.g., ±10 seconds). For example, the additional 17:55:25 timestamp data for the actual output and data input values are added as it is within 5 seconds of the 17:55:30 timestamp of one of the predicted output entries.

The combined exact matches and additional matches are then used to generate the new candidate model, as described above.

Alternative Embodiment for Self-Intelligent Entity

FIG. 4 is an alternative embodiment for the self-intelligent entity of FIG. 1, according to one embodiment. In contrast to FIG. 1, which illustrates a model assessor 130 separate from the SIEs 115, in another embodiment the SIEs 405 have additional elements which allow the SIEs 115 to improve themselves.

In the illustrated example, the SIEs 405B-N publish their predicted outputs 415 to the topic queue 410. The components of the SIEs 405B-N may be similar to SIE 405A, but are not illustrated in full for the sake of clarity. The predicted outputs 415 to which the SIE 405A subscribes to, similar to the data queue cache 205, are stored in a cache 430. However, the cache 430 is stored within the SIE 405A (e.g., within the node associated with the SIE 405A) rather than external to the SIE 115 as with FIG. 1.

The candidate model generator 435, similar to the candidate model generator 210, generates candidate models 440 using timestamp matched data generated by the data timestamp matcher 445, which is similar to the data timestamp matcher 215. These candidate models 440 are tested by the correlation tester 450 to determine one or more correlation scores for each, similar to the method described for the correlation tester 220. If these scores for a candidate model 440 exceed a threshold or criteria, the model updater 460 updates the prediction model 455, which is the original model, with the new candidate model 440 (along with any necessary SIEs), similar to the process described above.

Example Flow

Figure 5:
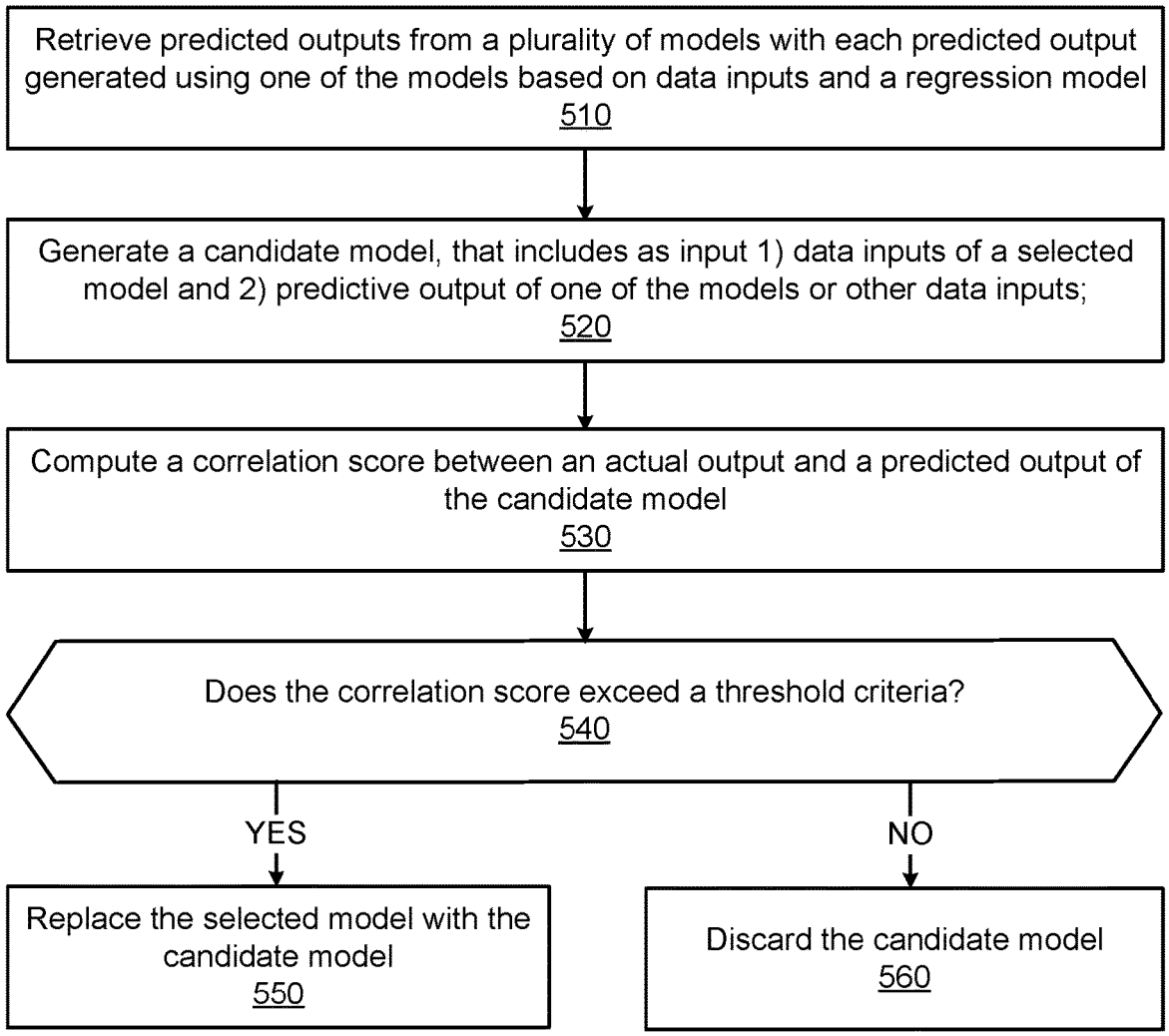
FIG. 5 is a flow chart illustrating an exemplary method for self-intelligent improvement in predictive data models, according to one embodiment.

FIG. 5 is a flow chart illustrating an exemplary method for self-intelligent improvement in predictive data models, according to one embodiment. In one embodiment, FIG. 5 attributes the steps of the method 400 to the model assessor 130. However, some or all of the steps may be performed by other elements (e.g., the SIE 405). In addition, some embodiments may perform the steps in parallel, perform the steps in different orders, or perform different steps. Also, it is noted that in one example embodiment the steps and/or modules may be embodied as instructions, e.g., instructions 624, that may be executed by the processor 602 described with respect to FIG. 6.

The model assessor 130 retrieves 510 predicted outputs from a plurality of models with each predicted output generated using one of the models based on data inputs and a regression model. These predicted outputs may be the predicted outputs 125 stored in the topic queue 120.

The model assessor 130 generates 520 a candidate model, that includes as input: 1) data inputs of a selected model and 2) predictive output of one of the models or other data inputs. The model assessor 130 computes 530 a correlation score between an actual output and a predicted output of the candidate model 520 to determine 530 if the correlation score exceeds a threshold criteria. The criteria, as noted above, may be a numerical value, or may be a categorization of the candidate model over multiple runs through multiple sets of validation data. If the correlation score exceeds the threshold criteria, the model assessor 130 replaces 550 the selected model with the candidate model. Otherwise, the model assessor 130 discards 560 the candidate model (and starts over again).

Example Machine Architecture

Figure 6:
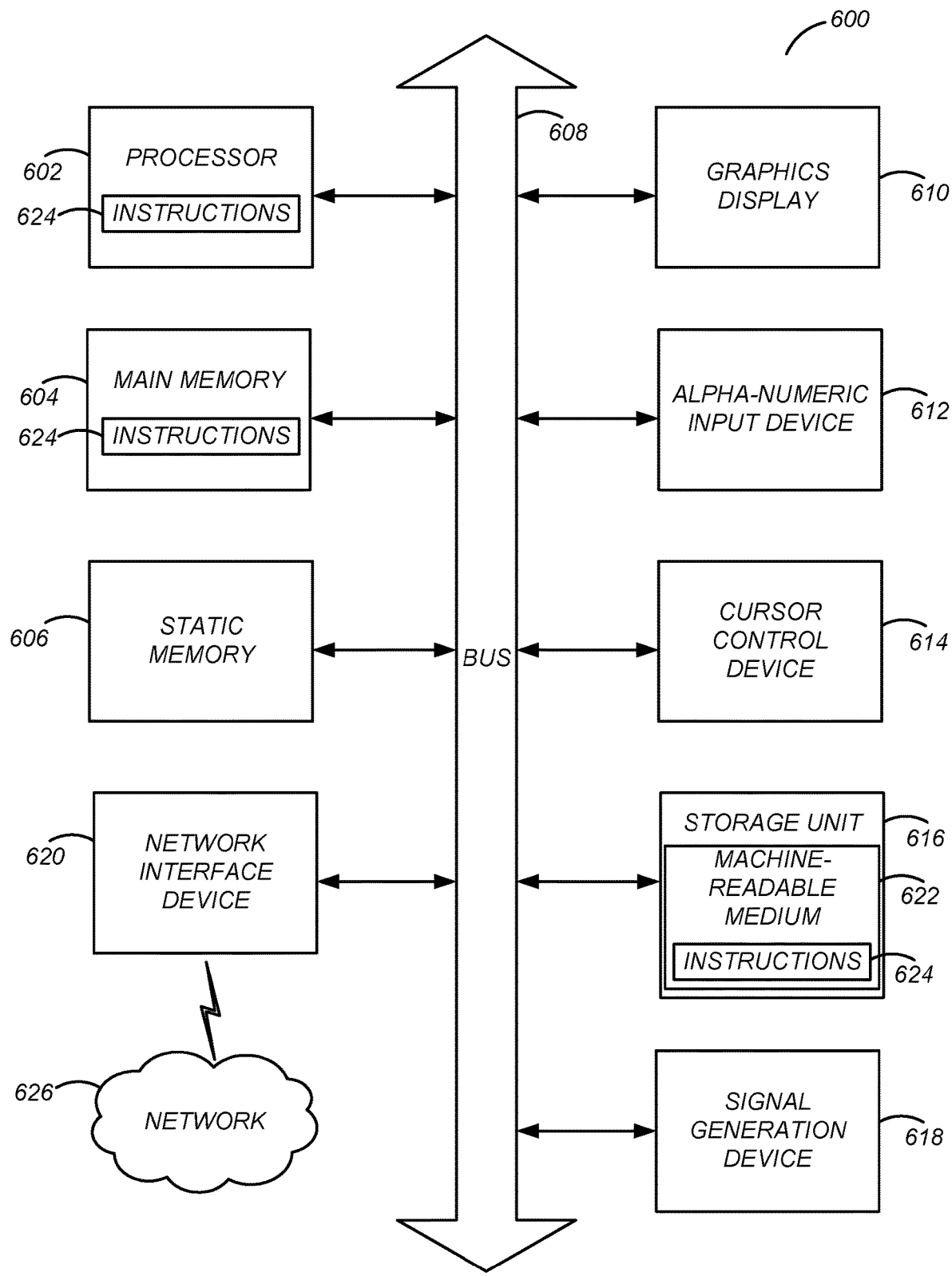
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. The computer system 600 is used to execute the processes and functionality described in FIGS. 1,2, and 4.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 606 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The system as disclosed provides benefits and advantages that include the ability to automatically improve the predictive performance of different predictive models. Instead of having the model be improved using expert domain knowledge, a computing system, without any such foreknowledge, is able to automatically and in an unsupervised manner improve upon predictions using the process described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-6. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 602) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (e.g., instructions 624) to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors 602 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory 604). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for self-intelligent improvement in predictive data models. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method, comprising:
   retrieving a plurality of predicted outputs from a plurality of models, each predicted output generated using one of the plurality of models based on one or more data inputs and a regression model;
   generating a candidate model, the candidate model including as input 1) the one or more data inputs of a selected model of the plurality of models and 2) at least one of predictive outputs of one or more other models of the plurality of models and one or more other data inputs of the one or more data inputs;
   computing a correlation score between an actual output and a predicted output of the candidate model;
   determining if the correlation score exceeds a threshold criteria;
   in response to the correlation score exceeding the threshold criteria, replacing the selected model with the candidate model; and
   in response to the correlation score not exceeding the threshold criteria, deleting the candidate model.

2. The method of claim 1, wherein the plurality of models are generated by:
   receiving a plurality of data inputs;
      generating a plurality of models using one or more regression analysis techniques, each of the plurality of models predicting as the predictive output one of the plurality of data inputs, by using one or more of the plurality of data inputs as input features.

3. The method of claim 1, wherein each model of the plurality of models executes within a node of a container system, the container system implementing operating-system-level virtualization.

4. The method of claim 1, wherein each model publishes its predicted output to a topic queue, the topic queue dividing each of the received predicted outputs into topics based on the model which generated the predicted output, and wherein the at least one of a predictive output of one or more other models used to generate the candidate model are received from a set of subscribed topics for the selected model.

5. The method of claim 1, wherein generating the candidate model further comprises:
   collecting a threshold number of samples of the predictive outputs of one or more other models;
   performing a regression analysis using the threshold number of samples of the predictive outputs of one or more other models and the one or more data inputs of a selected model as independent variables, and one or more actual outputs corresponding to the predicted output of the selected model as a dependent variable; and generating the candidate model based on results of the regression analysis.

6. The method of claim 5, further comprising:

filtering the one or more data inputs and the one or more actual outputs to include only those of the one or more data inputs and the one or more actual outputs having timestamps that are within a threshold temporal range of timestamps of the threshold number of samples of the predictive outputs of one or more other models.

7. The method of claim 1, wherein the threshold criteria is a higher value of 1) an average of a plurality of correlation scores of a plurality of previously generated candidate models and 2) a fixed threshold score.

8. A container system, comprising:

a plurality of nodes in the container system, the container system implementing operating-system-level virtualization, each node having a model generated using one or more regression analysis techniques, each of the plurality of models predicting as a predictive output one of a plurality of data inputs, by using one or more of the plurality of data inputs as input features;

a model assessor container configured to:

retrieve a plurality of predicted outputs from a plurality of models of the plurality of nodes, each predicted output generated using one of the plurality of models based on one or more data inputs of the plurality of data inputs and a regression model;

generating a candidate model, the candidate model including as input 1) the one or more data inputs of a selected model of the plurality of models and 2) at least one of predictive outputs of one or more other models of the plurality of models and one or more other data inputs of the one or more data inputs;

computing a correlation score between an actual output and a predicted output of the candidate model;

determining if the correlation score exceeds a threshold criteria;

in response to the correlation score exceeding the threshold criteria, replacing the selected model with the candidate model; and in response to the correlation score not exceeding the threshold criteria, deleting the candidate model.

9. The system of claim 8, further comprising:

a data queue to receive the plurality of predicted outputs of the plurality of models, and to send the plurality of outputs to the model assessor container, the data queue processing the plurality of predicted outputs on a first-in-first-out basis.

10. The system of claim 9, wherein the data queue divides each of the received predicted outputs into topics based on the model which generated the predicted output, and wherein the at least one of a predictive output of one or more other models used to generate the candidate model are received from a set of subscribed topics for the selected model.

11. The system of claim 8, wherein the model assessor container is further configured to:

collect a threshold number of samples of the predictive outputs of one or more other models;

perform a regression analysis using the threshold number of samples of the predictive outputs of one or more other models and the one or more data inputs of a selected model as independent variables, and one or more actual outputs corresponding to the predicted output of the selected model as a dependent variable; and generate the candidate model based on results of the regression analysis.

12. The system of claim 11, wherein the model assessor container is further configured to:

filter the one or more data inputs and the one or more actual outputs to include only those of the one or more data inputs and the one or more actual outputs having timestamps that are within a threshold temporal range of timestamps of the threshold number of samples of the predictive outputs of one or more other models.

13. The system of claim 1, wherein the threshold criteria is a higher value of 1) an average of a plurality of correlation scores of a plurality of previously generated candidate models and 2) a fixed threshold score.

14. A non-transitory computer readable storage medium storing computer-readable instructions that when executed by a processor of a computing system causes the processor to execute operations comprising:

retrieving a plurality of predicted outputs from a plurality of models, each predicted output generated using one of the plurality of models based on one or more data inputs and a regression model;

generating a candidate model, the candidate model including as input 1) the one or more data inputs of a selected model of the plurality of models and 2) at least one of predictive outputs of one or more other models of the plurality of models and one or more other data inputs of the one or more data inputs;

computing a correlation score between an actual output and a predicted output of the candidate model;

determining if the correlation score exceeds a threshold criteria;

in response to the correlation score exceeding the threshold criteria, replacing the selected model with the candidate model; and in response to the correlation score not exceeding the threshold criteria, deleting the candidate model.

15. The non-transitory computer readable storage medium of claim 14, wherein the plurality of models are generated by:

receiving a plurality of data inputs;

generating a plurality of models using one or more regression analysis techniques, each of the plurality of models predicting as the predictive output one of the plurality of data inputs, by using one or more of the plurality of data inputs as input features.

16. The non-transitory computer readable storage medium of claim 14, wherein each model of the plurality of models executes within a node of a container system, the container system implementing operating-system-level virtualization.

17. The non-transitory computer readable storage medium of claim 14, wherein each model publishes its predicted output to a topic queue, the topic queue dividing each of the received predicted outputs into topics based on the model which generated the predicted output, and wherein the at least one of a predictive output of one or more other models used to generate the candidate model are received from a set of subscribed topics for the selected model.

18. The non-transitory computer readable storage medium of claim 14, wherein the non-transitory computer readable storage medium stores further computer-readable instructions that when executed by the processor of the computing system causes the processor to execute operations comprising:

collecting a threshold number of samples of the predictive outputs of one or more other models;

performing a regression analysis using the threshold number of samples of the predictive outputs of one or more other models and the one or more data inputs of a selected model as independent variables, and one or more actual outputs corresponding to the predicted output of the selected model as a dependent variable; and generating the candidate model based on results of the regression analysis.

19. The non-transitory computer readable storage medium of claim 18, wherein the non-transitory computer readable storage medium stores further computer-readable instructions that when executed by the processor of the computing system causes the processor to execute operations comprising:

filtering the one or more data inputs and the one or more actual outputs to include only those of the one or more data inputs and the one or more actual outputs having timestamps that are within a threshold temporal range of timestamps of the threshold number of samples of the predictive outputs of one or more other models.

20. The non-transitory computer readable storage medium of claim 14, wherein the threshold criteria is a higher value of 1) an average of a plurality of correlation scores of a plurality of previously generated candidate models and 2) a fixed threshold score.

\* \* \* \* \*